US 6,628,974 B1

(12) United States Patent
Lim

(10) Patent No.: US 6,628,974 B1
(45) Date of Patent: Sep. 30, 2003

(54) FOLDER OPERATING APPARATUS FOR CELLULAR PHONE

(75) Inventor: Tae Hyeong Lim, Suwon-shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 523 days.

(21) Appl. No.: 09/687,226

(22) Filed: Oct. 13, 2000

(30) Foreign Application Priority Data

Jul. 13, 2000 (KR) .......................................... 2000-40188
Jul. 14, 2000 (KR) .......................................... 2000-40395
Jun. 27, 2000 (KR) .......................................... 2000-35601

(51) Int. Cl.$^7$ ................................................ H04B 1/38
(52) U.S. Cl. .................................. 455/575; 379/433.11
(58) Field of Search ........................ 455/575.3, 575.8, 455/90, 344, 347; 379/433.11, 433.13

(56) References Cited

U.S. PATENT DOCUMENTS 5,649,309 A * 7/1997 Wilcox et al. ............... 455/575
2001/0039193 A1 * 11/2001 Pan ............................. 455/575
2002/0025787 A1 * 2/2002 Lee ............................. 455/550
2002/0090970 A1 * 7/2002 Ko ............................... 455/575

* cited by examiner

Primary Examiner—Lee Nguyen
(74) Attorney, Agent, or Firm—Darby & Darby

(57) ABSTRACT

Disclosed is a folder operating apparatus for a cellular phone which can stably open and close a folder by compensating for the phase difference caused by the instability and the load of the folder operating apparatus by controlling the position of the folder. The folder operating apparatus includes a rotating section provided in a folder and having driving means for generating a driving force, a fixing section, connected to a body, for rotatably supporting the body at both sides of the rotating section, a power transferring section provided with a pair of members connected to the driving means and the fixing section, and selectively engaged together to face each other, an elastic means for applying to the power transferring section a supporting force greater than a driving torque of the driving means, and being elastically compressed so that the members of the power transferring section are separated from each other when an external force is applied to the folder, and position detecting means, installed at corresponding positions of the rotating section and the power transferring section, for controlling the driving means when the rotating section and the power transferring section are in a same-phase state.

17 Claims, 18 Drawing Sheets

FOLDER OPERATING APPARATUS FOR CELLULAR PHONE

BACKGROUND OF THE INVENTION

1. Field of the Invention

The present invention relates to a cellular phone in which a folder can be opened and closed both automatically and manually. In particular, the present invention relates to a folder operating apparatus for a cellular phone which can stably open and close a folder by compensating for the phase difference caused by the instability and the load of the folder operating apparatus by controlling the position of the folder.

2. Description of the Prior Art

Generally, a cellular phone (including personal communication services) is a mobile terminal through which a mobile communication service is provided within a predetermined service area where a portion of subscriber lines regionally fixed is wireless. While the existing communication service is provided through telephone lines installed in fixed places, a cellular phone makes telephone calls possible according to logical private numbers without limit to telephone lines or places.

Since such a cellular phone is easy to carry and convenient in use, the demand therefor is explosively increasing, and to satisfy consumers' diverse desires, it has become small-sized and multi-functional.

Typically, the cellular phone is classified into three types according to its shape. That is, a bar type having numeral (functional) buttons exposed on the outside, a flip type having a cover for covering the numeral (functional) buttons, and a folder type the body of which is folded by half. With the trend of miniaturization, the folder type cellular phone has been increasingly spread.

FIG. 1 is a perspective view of a conventional folder type cellular phone.

The conventional folder type cellular phone 100 is briefly composed of a body 110 and a folder 120. The body 110 includes numeral (functional) buttons, a microphone, various kinds of built-in signal transmitting/receiving components, and a battery pack mounted thereon for power supply.

The folder 120 includes a display window for displaying various kinds of call information and function information, a speaker, and various kinds of built-in components.

In the folder type cellular phone 100, one side of the folder 120 is connected to the body 110 by a hinge means, and the folder is opened/closed by rotating it in a forward or backward direction around the hinge means.

Specifically, opening and closing of the folder 120 of the cellular phone 100 is performed by the construction illustrated in FIG. 2.

A coil spring 112 which is an elastic member is fixed to a covered end portion of a hollow cylindrical housing 111 integrally formed on the folder 120, and to one side of the coil spring 112, i.e., to an open end portion of the housing 111 is fixed a male coupler 113 having a tapered portion formed on one side thereof so that the portion thereof is projected.

Also, on one side of the body 110 is formed a female coupler 114. On one end portion of the female coupler 114 is formed a connection part 115 connected to the folder 120 through the open end of the housing 111, and the other end portion of the female coupler 114 has a tapered recess for receiving therein the tapered, i.e., projected portion of the male coupler 113. The tapered portions of the male coupler 113 and the female coupler 114 are engaged together to fit each other.

The male coupler 113 and the female coupler 114 serve as a hinge shaft. When the folder 120 rotates, the male coupler 113 also rotates, but the rotation of the female coupler 114 is limited by a fixing hole of a fixing part formed on the body 110. However, if the male coupler 113 rotates over a predetermined angle, the male coupler 113 is pushed backward, compressing the coil spring as shown in FIG. 3.

Accordingly, in case of opening the folder 120, if the rotating angle of the male coupler 113 interlocked with the folder 120 is smaller than the taper angle between the male coupler 113 and the female coupler 114, the folder 120 returns to its original position and is kept in a closed state by the elastic force of the coil spring 112 acting between the male coupler 113 and the female coupler 114. If the rotating angle of the male coupler 113 interlocked with the folder 120 is larger than the taper angle, the male coupler 113 rotates by about 180°, and is re-engaged with the female coupler 114 to effect the opening of the folder 120.

Meanwhile, in case of closing the folder 120, if the rotating angle of the male coupler 113 is smaller than the taper angle between the male coupler 113 and the female coupler 114, the folder 120 maintains its open state by the returning force of the coil spring 112. If the rotating angle of the male coupler 113 is larger than the taper angle, the male coupler 113 rapidly rotates from a predetermined angle, and the tapered portions of the male coupler 113 and the female coupler 114 are re-engaged together to close the folder 120.

However, the conventional folder type cellular phone 100 as above has a disadvantage that since the folder 120 is somewhat heavy, a user should open the folder 120 with one hand in a state that the body 110 is held by the other hand.

In order to solve this problem, a cellular phone having an operating device for automatically opening/closing the folder 120 has been recently proposed.

According to this cellular phone, the folder 120 is automatically opened/closed by manipulating a switch with one hand to drive the operating device. Here, the most important matter to be considered is that it should be possible to operate the folder 120 manually as well as automatically.

FIG. 4 is a sectional view illustrating a main part of a cellular phone having an operating device installed in a housing.

Referring to FIG. 4, the driving device includes a motor 116 elastically supported by the coil spring, and a gear box 117 connected to the shaft of the motor 116.

The motor 116 operates by a switch manipulated by the user, and generates a driving force for a time period determined by a timer.

The gear box 117 is connected to the shaft of the motor 116 to reduce the rotating speed of the motor and to prevent the reverse rotation thereof. The output shaft of the gear box is connected to the male coupler 113 which is selectively engaged with the opposite female coupler 114.

If the switch is manipulated to automatically open the folder 120, the male coupler 113 and the female coupler 114 are fixedly engaged together, and the body 110 of the motor 116 rotates around the shaft. This makes the folder 120 having the housing 111 in which the motor 116 is fixedly installed also rotate for a predetermined time, and thus the folder is in an open state from the body 110.

On the contrary, if the switch is re-manipulated to close the folder 120, the body 110 of the motor 116 rotates in a reverse direction centering around the shaft, and this makes the folder 120 also rotate in a reverse direction and be in a close state.

Meanwhile, if the folder 120 rotates in a forward or backward direction from the body 110 by the user to manually open or close the folder 120, a slip is produced between the male coupler 113 and the female coupler 114, and the male coupler 113 compresses the coil spring 112 with the motor 116 to cause a displacement therebetween, so that the folder 120 rotates.

Then, if the folder 120 reach a predetermined position, the male coupler 113 returns to its original position by the elastic supporting force of the coil spring 112, and is re-engaged with the female coupler 114, so that the folder 120 is rapidly opened or closed.

According to the conventional folder type cellular phone, however, since the motor 116 for rotating the folder 120 operates for the time period determined by the timer, the folder 120 may not reach a complete open position/close position determined for complete opening/closing of the folder 120 in the event that the output characteristic, i.e., RPM of the motor 116 is changed.

Also, if the folder 120 is held by the hand during the automatic opening/closing of the folder 120, or if an external force acts on the folder 120 due to a faulty manipulation of the switch in a state that the cellular phone is pocketed, the male coupler 113 stops at any position, not the complete open/close position.

This causes the folder 120 not to be opened/closed completely or to be open over a predetermined open angle of 150° in a manual operation mode.

SUMMARY OF THE INVENTION

Therefore, an object of the invention is to provide a folder operating apparatus for a cellular phone, which can achieve a stable opening and closing of the folder by compensating for the phase difference caused by the alternation of automatic and manual operations of the folder or caused by the change of the output characteristic of a power generating means.

In accordance with the present invention, the above object is accomplished by providing a folder operating apparatus for a cellular phone comprising: a rotating section provided in a folder and having driving means for generating a driving force; a fixing section, connected to a body, for rotatably supporting the body at both sides of the rotating section; a power transferring section provided with a pair of members connected to the driving means and the fixing section, and selectively engaged together to face each other; an elastic means for applying to the power transferring section a supporting force greater than a driving torque of the driving means, and being elastically compressed so that the power transferring section is separated therefrom when an external force is applied to the folder; and position detecting means, installed at corresponding positions of the rotating section and the power transferring section, for controlling the driving means when the rotating section and the power transferring section are in a same-phase state.

BRIEF DESCRIPTION OF THE DRAWINGS

The above object, and other features and advantages of the present invention will become more apparent after a reading of the following detailed description when taken in conjunction with the drawings, in which.

DETAILED DESCRIPTION OF THE PREFERRED EMBODIMENTS

The present invention relates to a folder operating apparatus for a cellular phone which can stably open and close the folder by compensating for the phase difference caused by the instability and the load of the folder operating apparatus by controlling the position of the folder.

Figure 1:
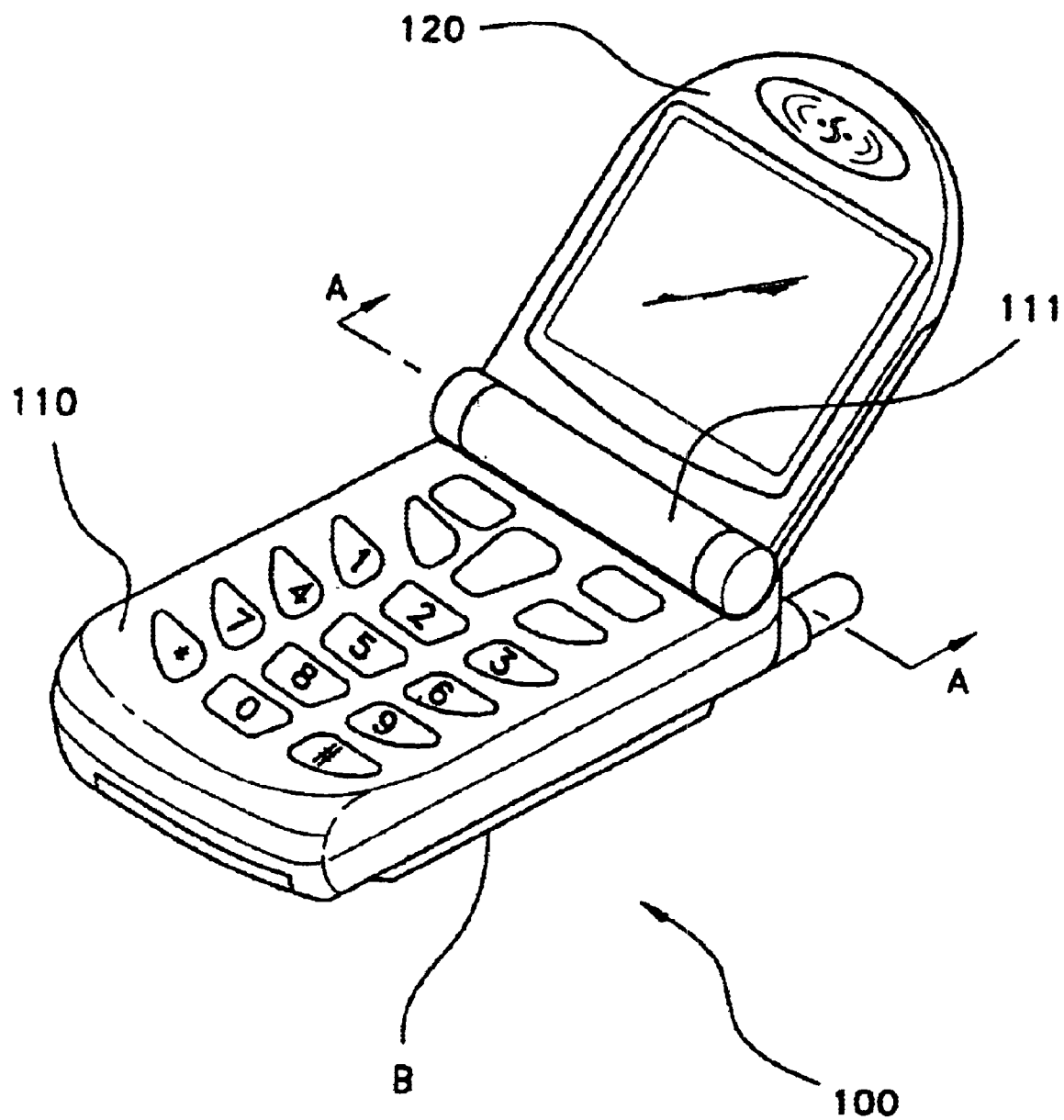
FIG. 1 is a perspective view illustrating the conventional folder type cellular phone.
Figure 2:
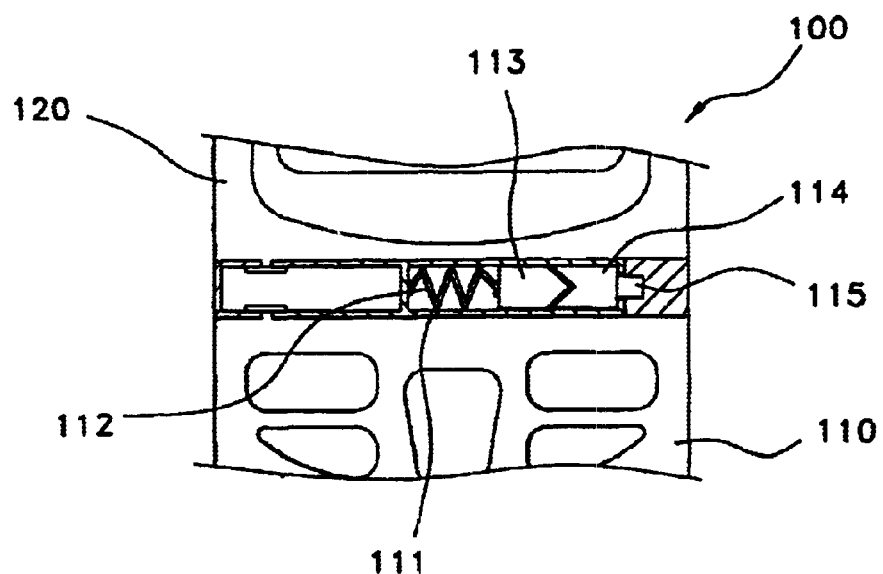
FIG. 2 is a sectional view taken along the "A—A" line of FIG. 1.
Figure 3:
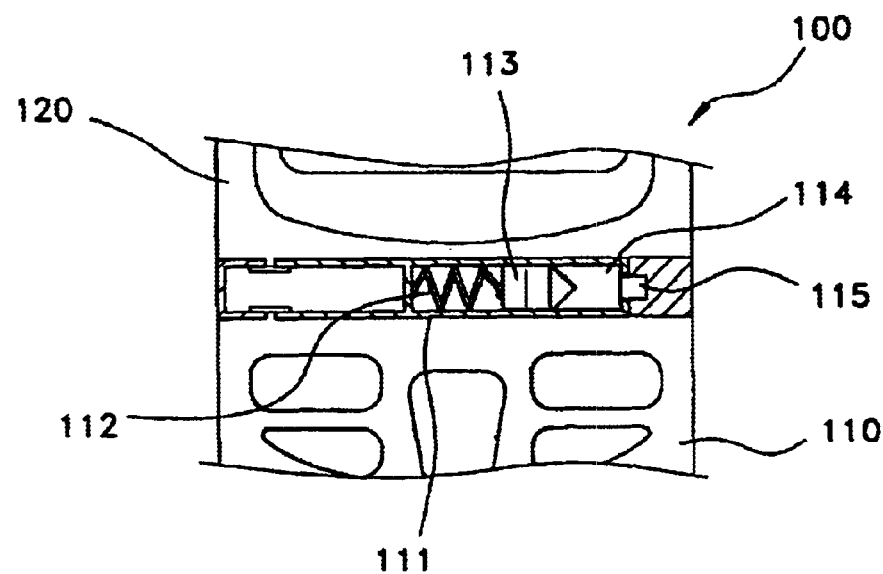
FIG. 3 is a sectional view illustrating the operating state of the cellular phone of FIG. 2.
Figure 4:
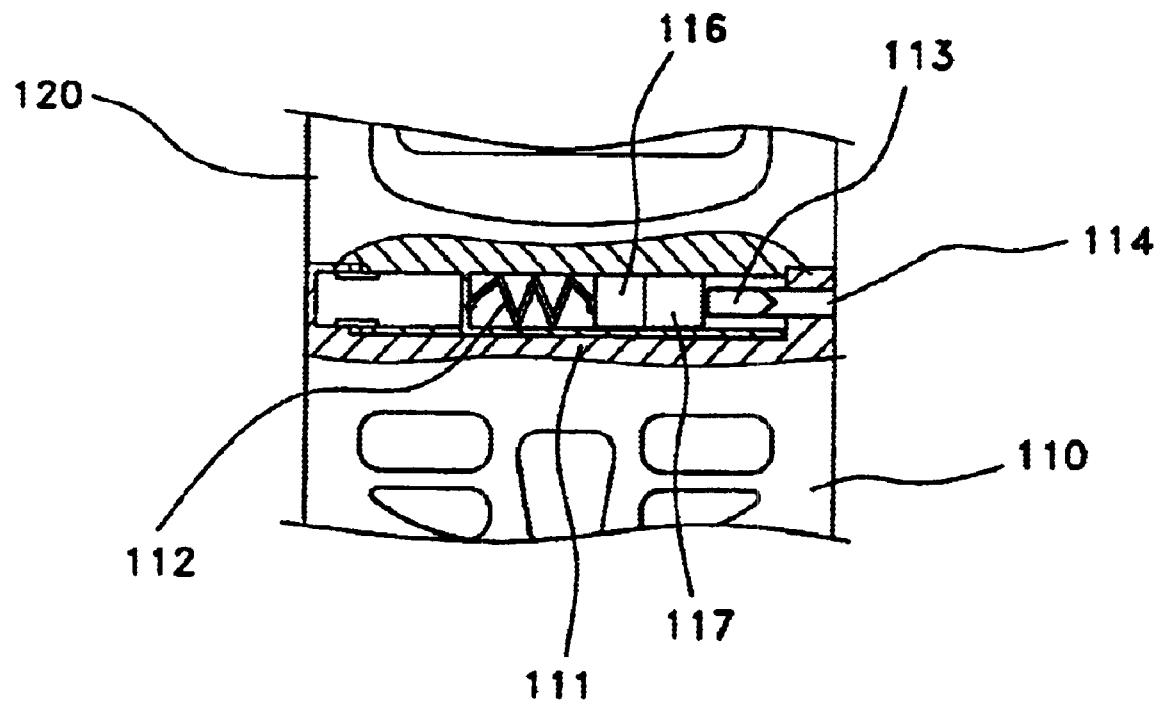
FIG. 4 is a sectional view illustrating another embodiment of the conventional folder type cellular phone.
Figure 5:
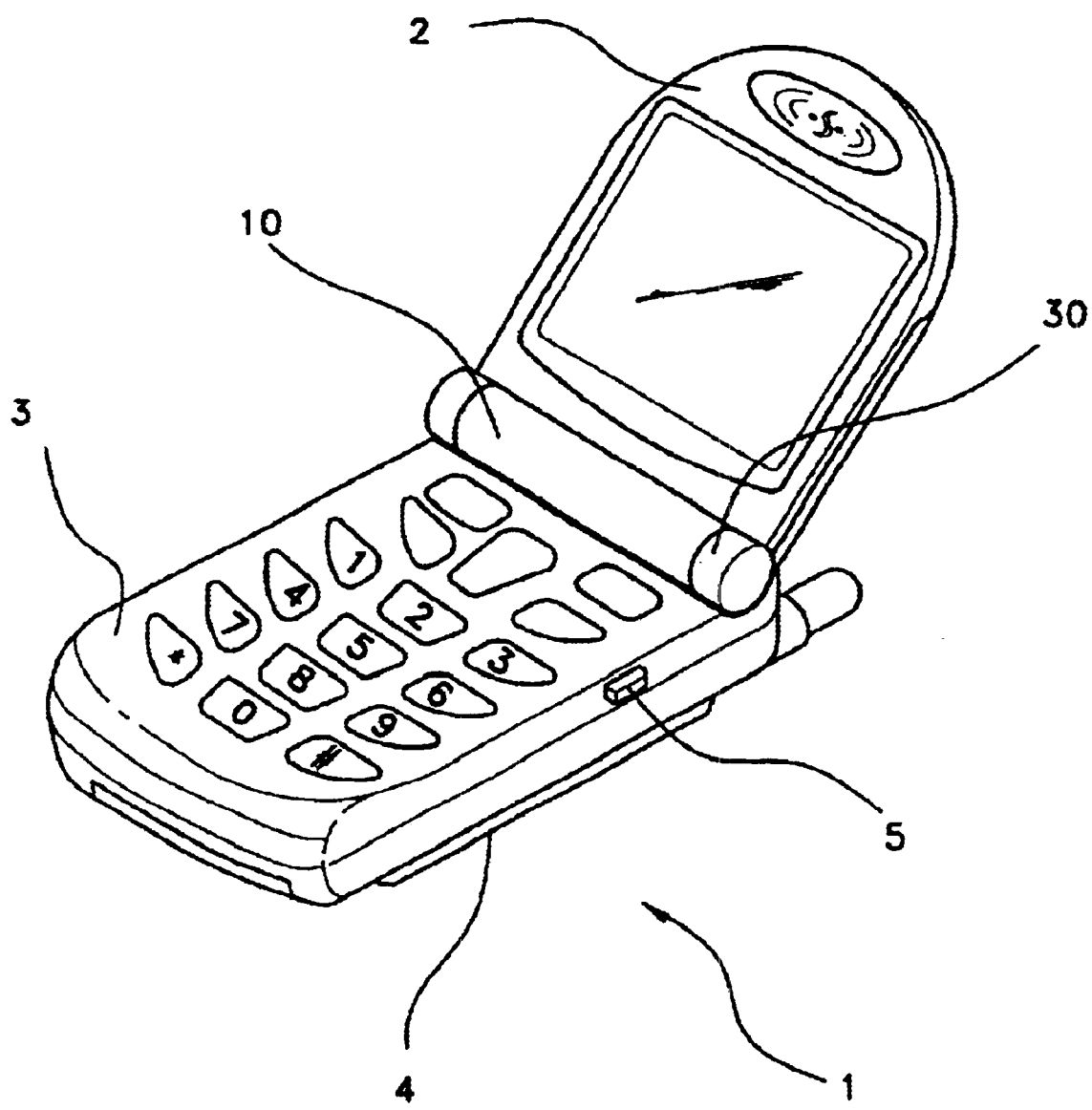
FIG. 5 is a perspective view illustrating a folder type cellular phone according to the present invention.

FIG. 5 is a perspective view illustrating the folder type cellular phone according to the present invention, and FIGS. 6 to 11 are sectional views illustrating the folder operating apparatus for a cellular phone according to the present invention.

The folder type cellular phone 1 includes a body 3 provided with various kinds of manipulation keys and a microphone, and a folder 2 provided with a display window for displaying various kinds of information and a speaker.

On one side of the body 3 is provided a pair of fixing sections 30 having a fixing hole 31, and the folder 2 is provided with a rotating section 10 positioned between the pair of the fixing sections 30. On one side of the rotating section 10 is formed a projection rotatably fitted into the fixing hole 31 of the fixing sections 30, and the other side thereof is open.

The construction as above is similar to that of the conventional cellular phone.

The folder operating apparatus for a cellular phone according to the present invention comprises a driving section 11 mounted in the rotating section 10, a power transferring section 20, connected to the driving section 11, for being selectively bound to or released from the driving section 11, a spring 40 for providing an elastic force, and a position detecting section 50 for detecting the position of the rotating section 10.

The driving section 11 is installed in the cylindrical rotating section 10 formed on one side of the folder 2, and produces a driving force for rotating the folder 2. Typically, the driving section 11 is composed of a motor and a reduction gear assembly.

Specifically, the motor is electrically connected to a switch provided on one side of the body 3, receives the power supply from the battery pack 4 mounted on the cellular phone 1 through the switch 5, and produces a predetermined rotating force in forward and reverse directions.

To the output shaft of the motor is connected the speed reduction gear assembly which comprises a plurality of planet gears for reducing the rotating speed of the motor with a predetermined reduction rate, and the planet gears perform the speed reduction of the motor as well as prevent the reverse rotation of the motor.

Thus, the driving section 11 rotates its output shaft with the speed reduced through the planet gears.

In the embodiments of the present invention, the driving section composed of the typical micro-motor and the speed reduction gear assembly is used. However, various kinds of driving devices having the structure capable of producing a stable driving force for driving the folder 2 and preventing the reverse rotation as well can be also used.

The power transferring section 20 is briefly composed of the male coupler 22 and the female coupler 23. One side of the male coupler 23 is tapered so that its center portion is projected, while one side of the female coupler 23 is tapered so that its center portion is recessed to fit the tapered portion of the male coupler 22.

The male coupler 22 and the female coupler 23 of the power transferring section 20 forms the structure that they are bound to each other to form a fixed point by the elastic supporting force of the spring when the driving force of the driving section 11 is transferred thereto, while they are released from each other when the folder 2 is manually opened/closed or an external force is applied to the folder operating in the automatic mode.

Figure 6:
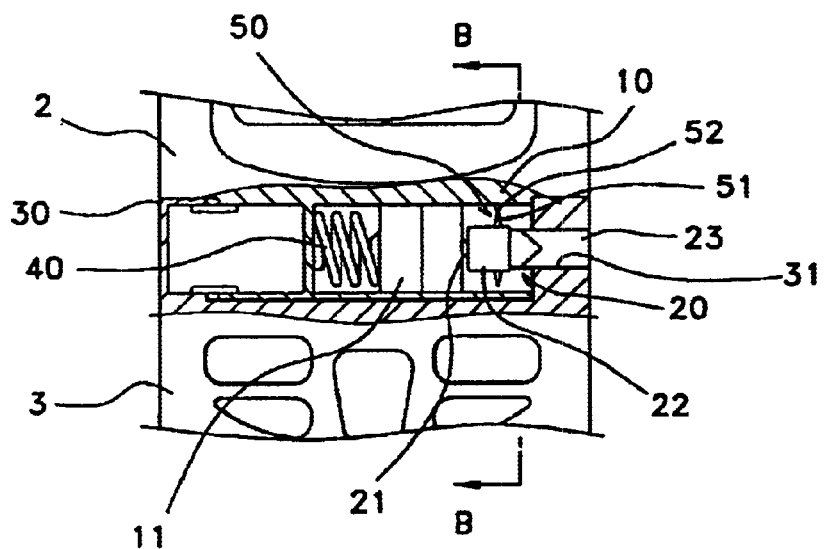
FIGS. 6 and 7 are sectional views illustrating the folder operating apparatus according to a first embodiment of the present invention.

As shown in FIG. 6, the male coupler 22 of the power transferring section 20 may be connected to a shaft 21 of the driving section 11, and the female coupler 23 may be connected to the fixing section 30. Also, as shown in FIG. 7, the female coupler 23 may be connected to the shaft 21 of the driving section 11, and the male coupler 22 may be connected to the fixing section 30.

As a result, the male coupler 22 and the female coupler 23 of the power transferring section 20 can be connected to the driving section 11 and the fixing section 30, respectively, and vice versa if they form the structure that they can be bound to and released from each other.

The spring 40 is typically made of a material having a superior elastic deformation rate and restoring force. The spring 40 can be installed in the rotating section 10 or fixing section 30 in accordance with its kind.

Figure 7:
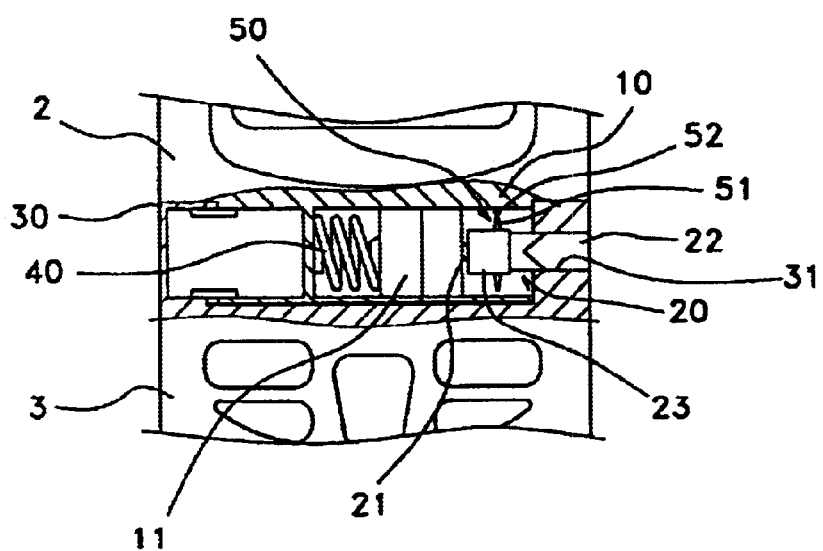

FIGS. 6 and 7 illustrate the spring 40 installed in the rotating section 40. As illustrated, one end of the spring 40 is connected to one side of the rotating section 10, and the other end thereof is connected to one side of the driving section 11.

Figure 8:
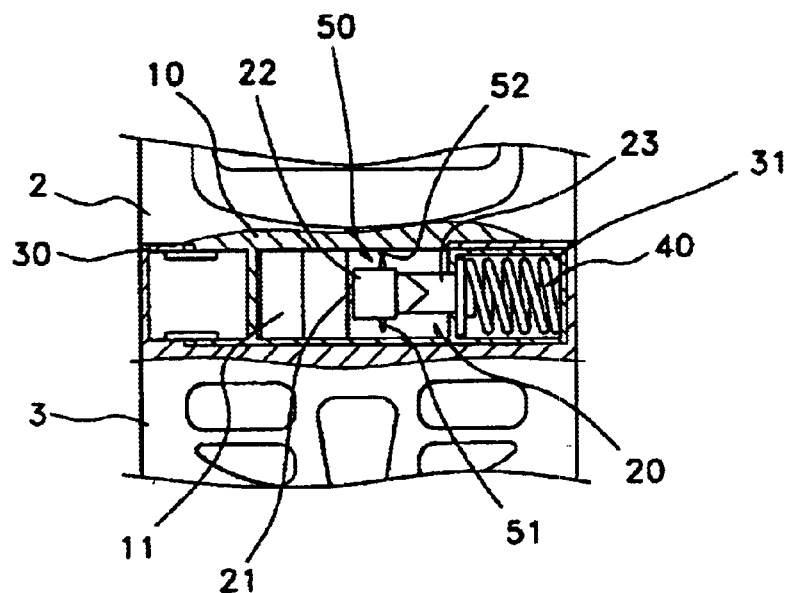
FIGS. 8 and 9 are sectional views illustrating another embodiment of the folder operating apparatus of FIGS. 6 and 7.
Figure 9:
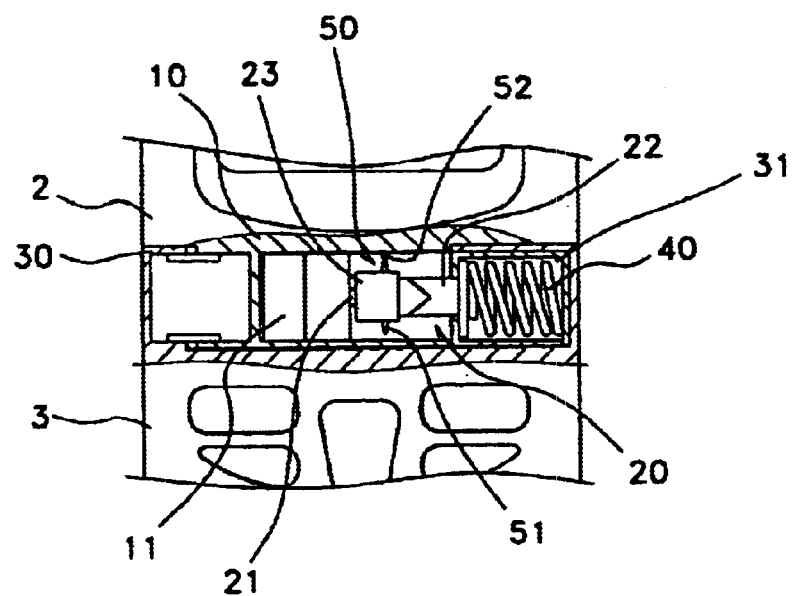

FIGS. 8 and 9 illustrate the cellular phone 1 in which the spring 40 is installed in the fixing hole 31 of one of the pair of the fixing sections 30. As illustrated, one end of the spring 40 is connected to one side of the fixing hole 31, and the other end thereof is connected to one side of the power transferring section 20.

As shown in FIG. 8, the male coupler 22 of the power transferring section 20 may be connected to the shaft 21 of the driving section 11, and the female coupler 23 may be connected to the fixing section 30. Also, as shown in FIG. 9, the female coupler 23 may be connected to the shaft 21 of the driving section 11, and the male coupler 22 may be connected to the fixing section 30.

Figure 10:
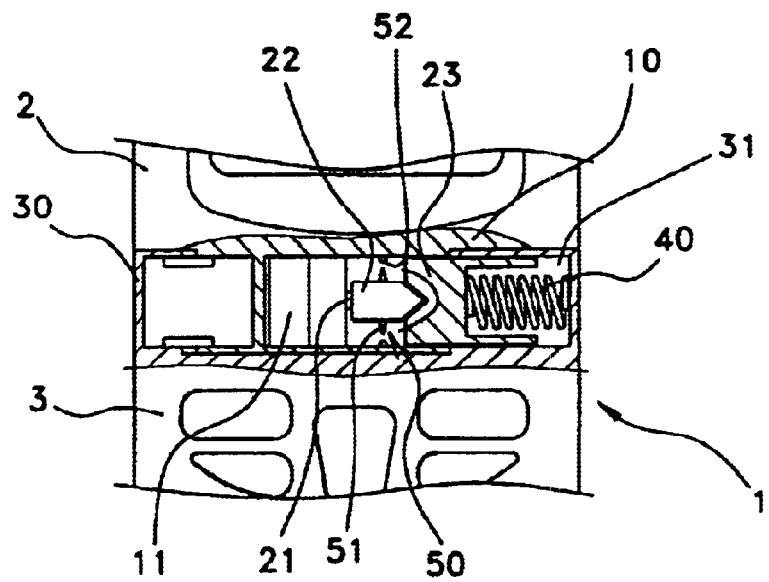
FIGS. 10 and 11 are sectional views illustrating another embodiment of the power transferring section of FIGS. 8 and 9.
Figure 11:
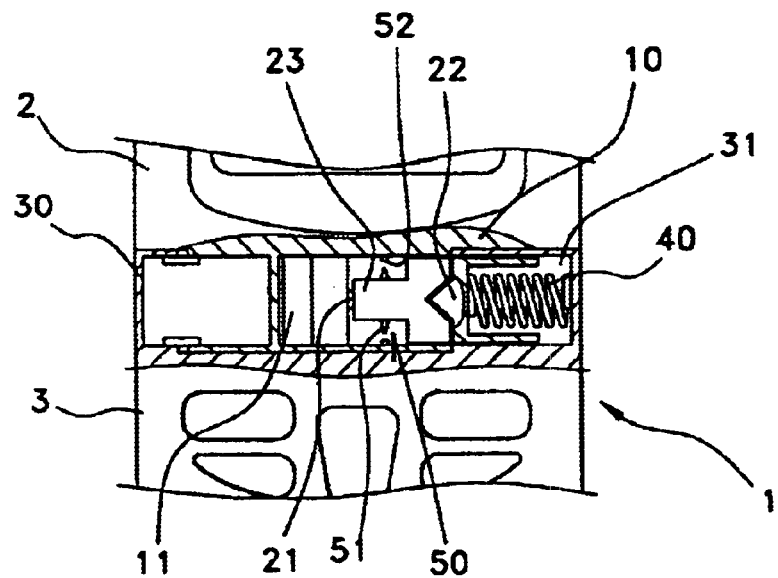

FIGS. 10 and 11 illustrate another embodiment of the power transferring section 20 of FIG. 8.

The power transferring section 20 of FIG. 10 has the structure that the male coupler 22 is connected to the shaft 21 of the driving section 11 to receive the driving force therefrom, and the female coupler 23 is provided at an opposite position to the male coupler 22. The one side of the female coupler 23, which has a cap shape, is inserted into the fixing hole 31 of the fixing section 30, and the both ends of the spring 40 are connected to the inner part of the cap-shaped female coupler 23 and the fixing hole, respectively.

The power transferring section 20 of FIG. 11 has the same structure as that of the power transferring section 20 of FIG. 10. However, the female coupler 23 is connected to the shaft 21 of the driving section 11, and the male coupler 22 is inserted inside the fixing hole 31. The male coupler 22 has an extended end portion in the form of a cap that is connected to the one end of the spring 40.

Meanwhile, the spring 40 installed in the rotating section 10 or the fixing section 30 maintains the elastic supporting force greater than the driving force generated from the driving section 11, and by applying this elastic supporting force to the power transferring section 20, the male coupler 22 and the female coupler 23 which constitute the power transferring section 20 are selectively bound to or released from each other.

Specifically, when the folder 2 is opened or closed by the driving section 11, the spring 40 applies the supporting force greater than the driving force of the driving section 11 to the power transferring section 20, and thus the male coupler 22 and the female coupler 23 constituting the power transferring section 20 maintains their bound state. In case of manually opening/closing the folder 2, the spring 40 is elastically deformed.

The position detecting section 50 controls the driving section 11 so that the phase difference as much as 30° is compensated for with respect to the folder opening and closing angles of 0° and 150°, respectively.

The position detecting section 50 includes position detectors 51 and 52 installed on the positions of the power transferring section 20 and the rotating section 10 to face each other, and these position detectors 51 and 52 obtain the same-phase information and apply a specified control signal to the driving section 11.

Specifically, if the rotating section 10 and the power transferring section 20 have the same phase, the position detecting section 50 detects it, and applies the stop control signal to the driving section 11 to control the driving section 11.

Here, as the position detectors 51 and 52 of the position detecting section 50, magnetic sensors or photosensors which output specified electric signals as a result of detection can be used. Also, any contact switches may be used as the position detectors.

Meanwhile, the position detectors 51 and 52 of the position detecting section 50 may be installed as shown in FIGS. 6 and 7 to obtain the same-phase information of the rotating section 10 and the power transferring section 20.

As shown in FIG. 6, a pair of position detectors 51 may be installed at an interval of 180° on the outer periphery of the male coupler 22 connected to the driving section 11 through the shaft 21, and one or more position detectors 52 may be installed on the inner periphery of the rotating section 10 to face the position detectors 51, so that the same-phase detection signal is applied to the driving section 11 when they are positioned at an angle of 180°.

Also, as shown in FIG. 7, a pair of position detectors 51 may be installed at an interval of 180° on the outer periphery of the female coupler 23 connected to the driving section 11 through the shaft 21, and one or more position detectors 52 may be installed on the inner periphery of the rotating section 10 to face the position detectors 51, so that the same-phase information can be detected.

Meanwhile, the position detecting section 50 may be installed at diverse positions where the same-phase information can be detected between the rotating section 10 and the power transferring section 20.

The position detecting section 50 may comprise a position detector installed on the output shaft of the driving section 11, and another position detector installed on the rotating section 10 to face the position detector on the driving section 11, so that the same-phase information can be detected.

Also, the position detecting section 50 may comprise a position detector installed on one side of the driving section 11, and another position detector installed on one side of the male coupler 22 connected to the driving section 11 through the shaft 21 to face the position detector of the driving section, so that the same-phase information can be detected.

Also, the position detecting section 50 may comprise a position detector installed on one side of the driving section 11, and another position detector installed on one side of the shaft 21 to face the position detector of the driving section, so that the same-phase information can be detected.

As described above, the position detecting section 50 includes the position detector 51 installed on the rotating section 10 or a component integrally connected to the rotating section 10, and the position detector 52 installed on the power transferring section 20 or a component integrally connected to the power transferring section 20 to face the position detector 51, and thus the same-phase information is cetected to control the driving section 11.

The operation of the folder driving apparatus for a cellular phone according to the present invention as constructed above will be explained in detail.

First, if the user rotates the folder in the forward or backward direction to manually open or close the folder 2, the rotating section 10 also rotates in the forward or backward direction in association with the folder 2.

At this time, since the rotating force applied to the rotating section 10 is greater than the elastic supporting force from the spring 40, the male coupler 22 and the female coupler 23 in the power transferring section 20 are slipped and separated from each other.

Specifically, in the first embodiment illustrated in FIG. 6, the driving section 11, to which the elastic supporting force is applied from the spring 40 installed on its side, is connected to the male coupler 22 through the shaft 21, and the female coupler 23, which is selectively bound to the male coupler 22, is connected to the fixing section 30.

Accordingly, in case of manually opening/closing the folder 2, the external force acting on the folder 2 is greater than the elastic supporting force of the spring 40 as described above, and the male coupler 22 and the female coupler 23 are slipped and separated from each other. Simultaneously, the female coupler 23 compresses the spring as it retreats, and thus the folder 2 can be manually opened/closed.

FIG. 8 is a sectional view illustrating another embodiment of the cellular phone 1. According to this embodiment, in case of manually opening/closing the folder 2, the male coupler 22 connected to the shaft 21 of the driving section 11 and the female coupler 23 connected to the fixing section 30 via the spring 40 are slipped and separated from each other, and simultaneously the female coupler 23 compresses the spring as it retreats, so that the folder 2 can be manually opened/closed.

According to the cellular phone 1 of FIG. 8, since the elastic spring 40 is mounted on the fixing section 30, it can reduce the length of the rotating section 10 in comparison to the conventional structure that the spring is constructed in the rotating section. Thus, the size and weight of the product can be reduced and the degree of freedom in designing the cellular phone can be improved.

As described above, the folder opening/closing apparatus for a cellular phone according to the present invention has the advantages that the length of the rotating section is reduced by mounting the elastic spring on the fixing section, and thus miniaturization of the cellular phone is achieved.

Also, since the construction for performing the opening/closing of the folder is simplified, the degree of freedom in designing the cellular phone is increased as well as the performance of the cellular phone is improved.

Although the embodiments of the folder type cellular phone in accordance with the present invention has been have been illustrated, the present invention is not limited to the folder type cellular phone, but is applicable to any mobile communication apparatus and diverse types of portable electronic appliances provided with a cover (i.e., flip) which is rotatably connected to a main body by a hinge.

Figure 12:
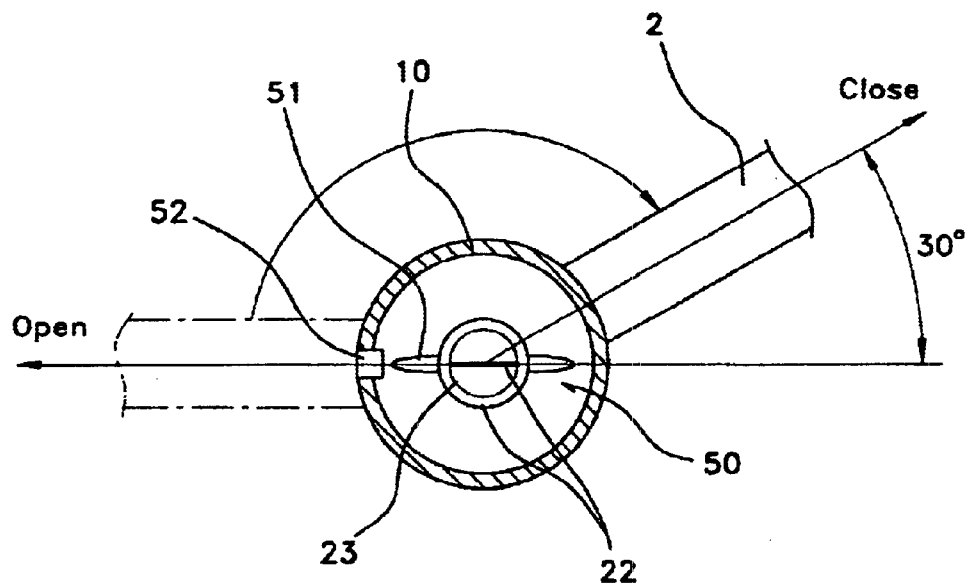
FIGS. 12 to 14 are sectional views taken along the "B—B" line of FIG. 6 for illustrating the opening of the folder in an automatic mode according to the present invention.
Figure 13:
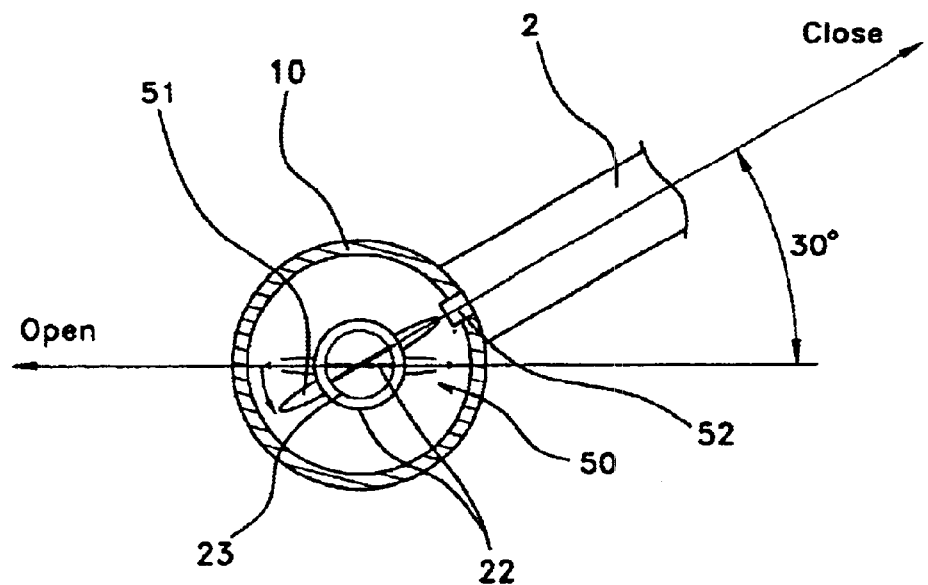
Figure 14:
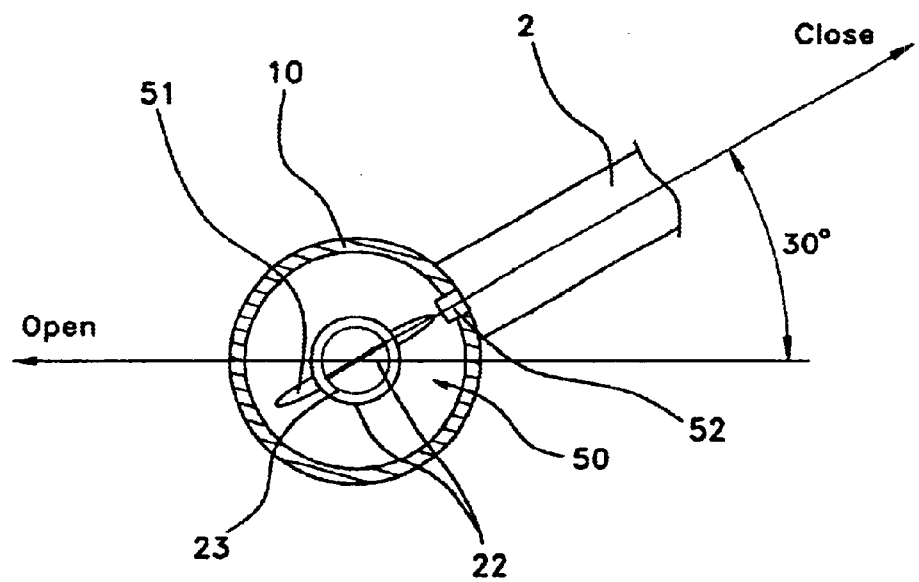

FIGS. 12 to 14 are views taken along the "B—B" line of FIG. 6, and illustrate the automatic opening of the folder 2.

Now, the operation of the folder operating apparatus for a cellular phone will be explained based on the first embodiment illustrated in FIG. 6.

If the user manipulates the switch 5 provided on one side of the body 3 to automatically open the folder 2, the switch 5 applies an electric signal to the driving section 11.

The driving section 11 receives the power supply from the battery pack 4 mounted on the cellular phone 1, and produces a rotating force for opening the folder 2. The rotating force of the driving section 11 is transferred to the male coupler 22 connected to the shaft 21.

At this time, since the male coupler 22 and the female coupler 23 have rotated for a predetermined angle and compressed the spring 40, they return to their horizontal positions by the restoring force of the spring 40 during the operation of the driving section 11.

Then, the male coupler 22, being engaged with the female coupler 23 installed in the fixing section 30 to face the male coupler 22, receives the rotating force of the driving section 11. At this time, since the elastic supporting force of the spring 40 is greater than the driving force of the driving section 11, the male coupler 22 and the female coupler 23 maintains in their bound state.

Accordingly, since the female coupler 23 is fixed to the fixing section 30, and the male coupler 22 connected to the female coupler 23 is also in a fixed state, the driving section 11 is rotated.

Thus, since the driving section 11 is mounted in the rotating section 10, the rotating section 10 is also rotated, and this causes the folder 2 to be rotated in one direction to reach its open position.

At this time, if the position detector 52 installed on the inner periphery of the rotating section 10 and the position detector 51 installed on the outer periphery of the male coupler 22 are in the same phase, the electric signal is applied to the driving section 11 to stop the driving, and thus the opening of the folder 2 is completed.

Figure 15:
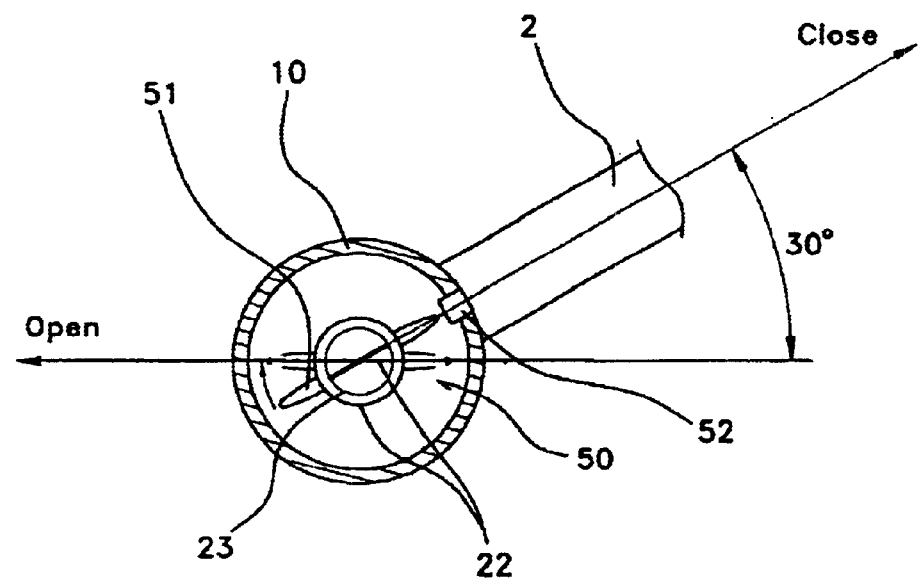
FIGS. 15 to 17 are sectional views illustrating the closing state of the folder in an automatic mode according to the present invention.
Figure 16:
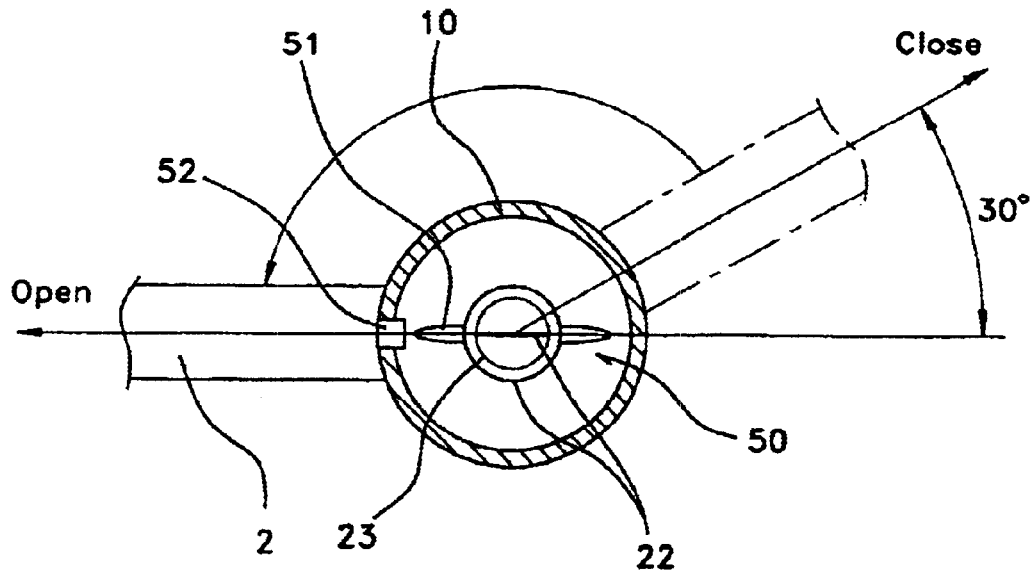
Figure 17:
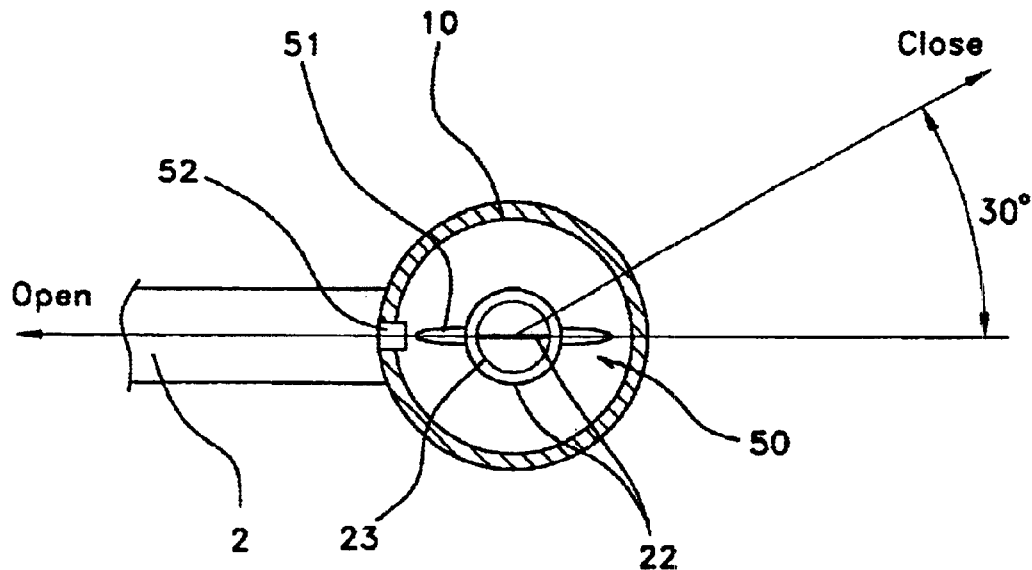

FIGS. 15 to 17 are views taken along the "B—B" line of FIG. 6, and illustrate the closing of the folder 2 in the automatic mode according to the present invention.

Now, the operation of the folder operating apparatus for a cellular phone 1 will be explained based on the embodiment illustrated in FIG. 6.

If the user manipulates the switch 5 provided on one side of the body 3 to automatically close the folder 2, the switch 5 applies an electric signal to the driving section 11.

The driving section 11 receives the power supply from the battery pack 4 mounted on the cellular phone 1, and produces a rotating force for closing the folder 2. The rotating force of the driving section 11 is transferred to the male coupler 22 connected to the shaft 21.

At this time, since the male coupler 22 and the female coupler 23 connected to the fixing section 30 are in their bound state by the supporting force of the spring 40, the power transferring section 20 composed of the male coupler 22 and the female coupler 23 is maintained in a fixed state.

Since the power transferring section 20 is in the fixed state, the outer body of the driving section 11 is rotated.

Thus, the folder 2 provided with the rotating section 10 where the driving section 11 is mounted is rotated in the reverse direction to reach its close position.

When the folder 2 reaches its close position, it cannot be further rotated due to the contact with the body 3, and thus a load acts on the driving section 11.

At this time, since the load acting on the folder 2 is greater than the elastic supporting force of the spring 40, the male coupler 22 and the female coupler 23 are slipped and separated from each other, and the driving section 11 simultaneously retreats, compressing the spring 40.

Thus, the male coupler 22 receives the driving force of the driving section 11 and is rotated. At this time, if the position detector 52 installed on the inner periphery of the rotating section 10 and the position detector 51 installed on the outer periphery of the male coupler 22 are in the same phase, a stop signal is applied to the driving section 11 to complete the closing of the folder 2.

Figure 18:
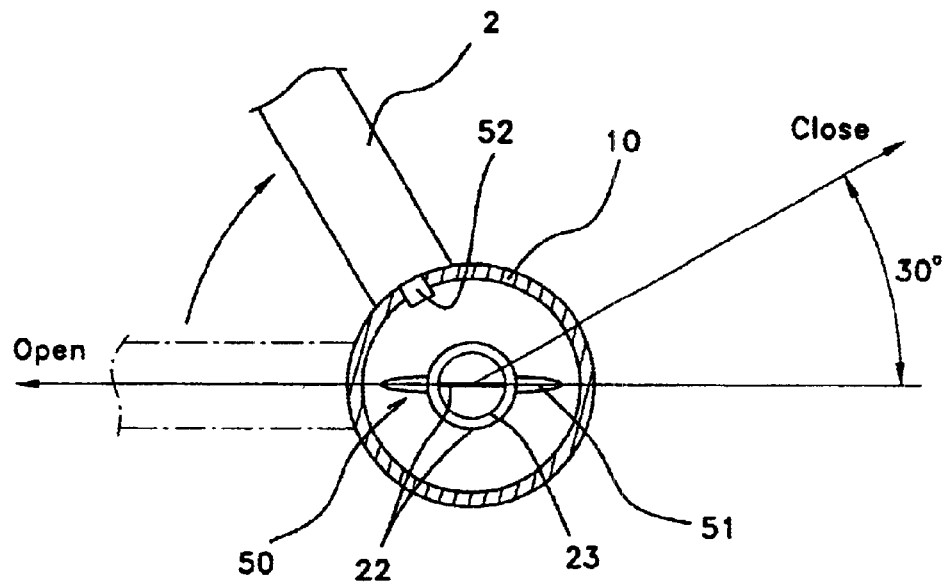
FIGS. 18 and 19 are sectional views illustrating the state that an external force is applied to the folder in the folder operating apparatus according to the present invention.
Figure 19:
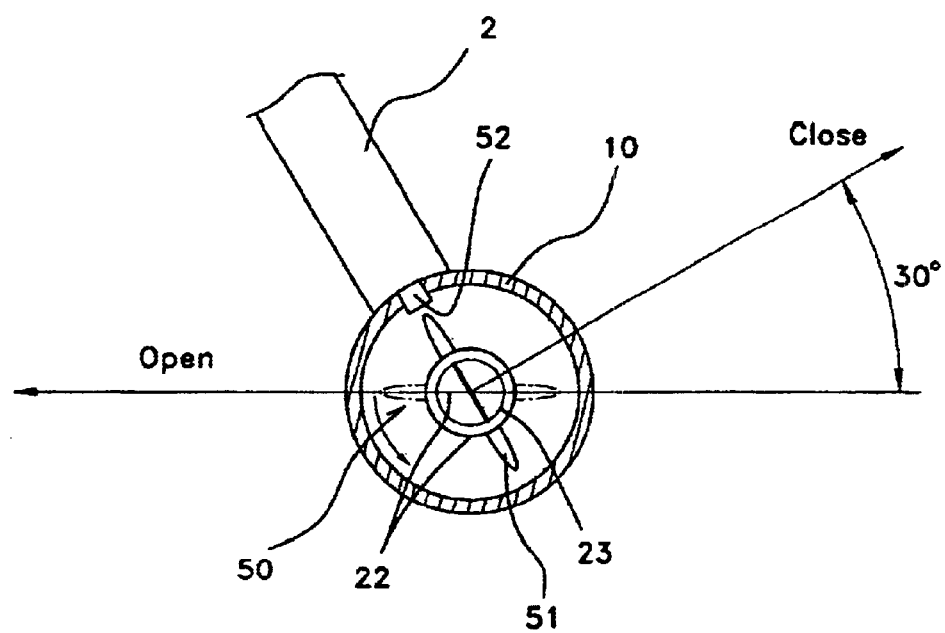

FIGS. 18 and 19 are sectional views illustrating the state that an external force is applied to the folder in the folder operating apparatus according to the present invention. FIGS. 18 and 19 are views taken along the "B—B" line of FIG. 6. The operation of the folder operating apparatus for a cellular phone will be explained based on the embodiment illustrated in FIG. 6.

If the folder 2 is loaded during the opening operation of the folder 2 in the automatic mode, the folder is fixed, and the male coupler 22 conquers the elastic supporting force of the spring and is rotated, being slipped off the female coupler 23.

Accordingly, the position detector 51 of the male coupler 22 and the position detector 52 installed on the rotating section 10 are in the same phase, the driving section 11 stops, and the positions of the male coupler 22 and the folder 2 become the same as those effected in the manual mode.

Thus, the folder 2 moves to either the open position or the close position that is nearer to the folder to complete the opening or closing of the folder.

Meanwhile, even in case that the folder is loaded during the closing operation of the folder 2 in the automatic mode, the opening and closing of the folder 2 is completed in the same manner as the case during the opening of the folder.

Accordingly, the folder operating apparatus according to the present invention automatically moves the folder to its initial position or its open position even if the external force acts on the folder during the automatic opening and closing operation of the folder, and thus the continuity of the folder operation is secured.

Figure 20:
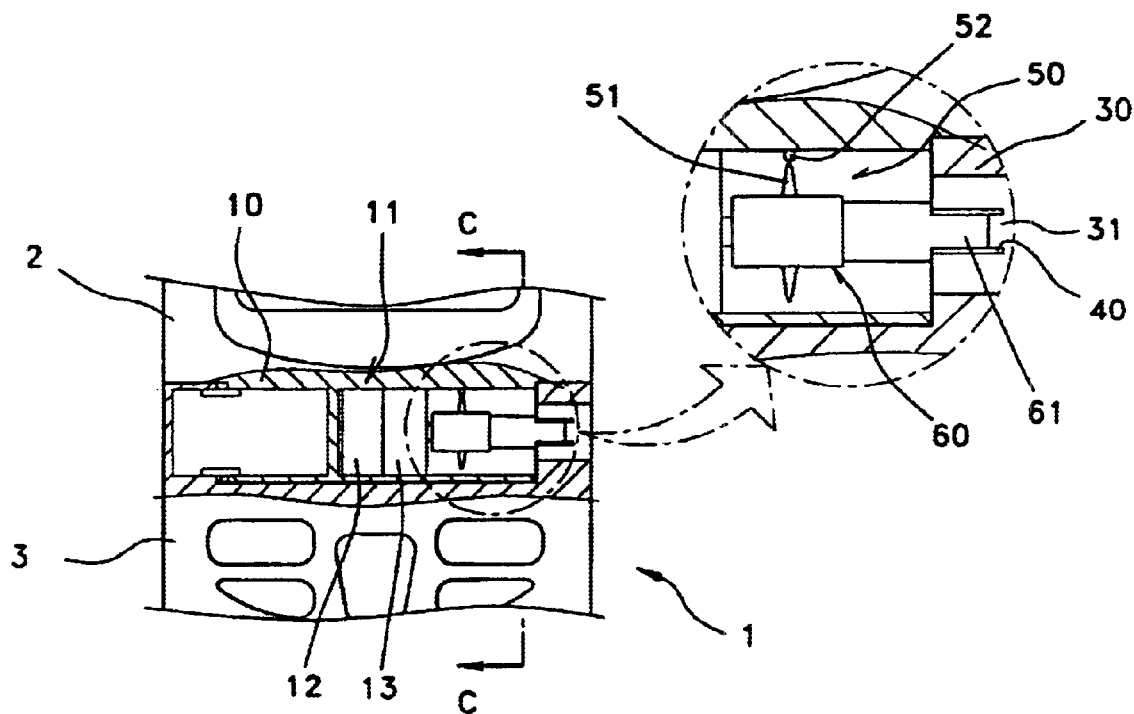
FIG. 20 is a sectional view illustrating the folder operating apparatus for a cellular phone according to a second embodiment of the present invention.
Figure 21:
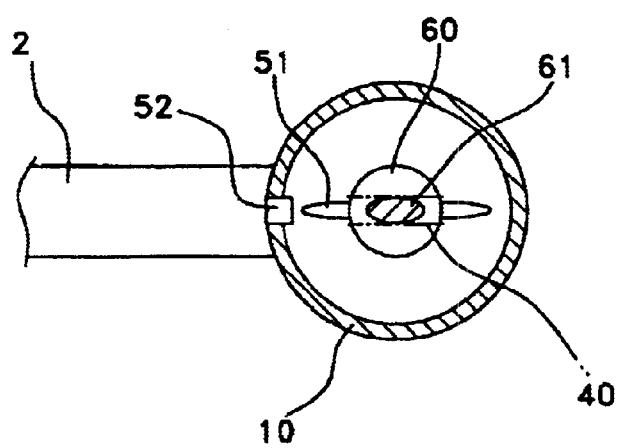
FIG. 21 is a sectional view taken along the "C—C" line of FIG. 20.

FIGS. 20 and 21 are sectional views illustrating the folder operating apparatus for a cellular phone according to the second embodiment of the present invention. In this embodiment, the folder operating apparatus for a cellular phone comprises a driving section 11, a hinge shaft 60, a spring 40, a switch 5, and a position detecting section 40.

The driving section 11 is installed in the cylindrical rotating section 10 formed on one side of the folder 2, and produces a driving force for rotating the folder 2. The driving section 11 is composed of a motor 12 and a reduction gear assembly 13. The motor 12 receives the power supply from the battery pack4 mounted on the cellular phone, and produces a predetermined rotating force in forward and reverse directions according to the manipulation of the switch 5.

To the output shaft of the motor is connected the speed reduction gear assembly 13 which comprises a plurality of planet gears. These planet gears have a predetermined reduction rate, and thus serve to reduce the rotating speed of the motor and to prevent the reverse rotation of the motor.

Thus, the driving section 11 transfers to a hinge shaft 60 the rotating force with its speed reduced through the planet gears.

The hinge shaft 60 is connected to the output shaft of the driving section 11, and is rotated with the output shaft of the driving section 11. A rectangular cam 61 is formed on an end portion of the hinge shaft 60, and this cam 61 is inserted into a fixing hole 31 formed on one of a pair of shaft fixing sections 30 projected from one side of the body 3, being elastically supported by the spring 40.

The spring 40 is typically made of a material having a superior elastic deformation rate and restoring force. A pair of plate springs may be installed at a predetermined interval in the shaft fixing hole 31 in which the cam 61 of the hinge shaft 60 is inserted. These plate springs are in contact with both sides of the cam 61 to elastically support the cam 61.

Here, the interval between the plate springs is determined to have the width in proportion to the shortest width that the rectangular cam 61 has. When the cam 61 is rotated, the plate springs extend in an outer direction as long as the longest width that the cam 61 has.

Thus, when the hinge shaft 60 is elastically supported by the spring 40 such as the above-mentioned plate spring, in the automatic mode, the outer body of the motor 12 is rotated about the hinge shaft 60 as a fixing point, and in the manual mode, the hinge shaft 60 is prevented from reverse rotation by a reduction gear assembly 13 thus to deform the spring.

The switch 5 operates the driving section 11 by receiving the user's operative force. In operation, when the user operates the switch 5, predetermined electric signals are output to the motor 12 connected to the output terminal.

Though the switch 5 is provided on one side of the body 3 as an usual ON/OFF switch in the present invention, many modifications may be possible according to the shape of the cellular phone 1 and a position on which the user operates the switch easily.

A position detecting means 40 operates the driving section 11 so as to correct the phase difference by 30 degrees relative to 0 degree and 150 degrees that are an open/close angles of the folder.

That is, position detectors 51 and 52 of the position detector means 40 are respectively mounted on positions corresponding to the hinge shaft 60 and the rotating section 10, and when the position detectors 51 and 52 have the same phase each other, a predetermined control signal is applied to the driving section 11 to stop the driving of the motor 12.

Meanwhile, the position detectors 51 and 52 are mounted as shown in FIG. 21 to FIG. 24 so as to receive the same phase information at a predetermined angle.

That is, as shown in FIG. 21, on the outer periphery of the hinge shaft 60, the position detector 51 is mounted at an interval of 180 degrees, and on the inner periphery of the rotating section 10 opposite to outer periphery of the hinge shaft, the other position detector 52 is mounted, so that the two position detectors have the same phase each other at 180 degrees, thus to apply an electric signal to the motor 12.

Figure 22:
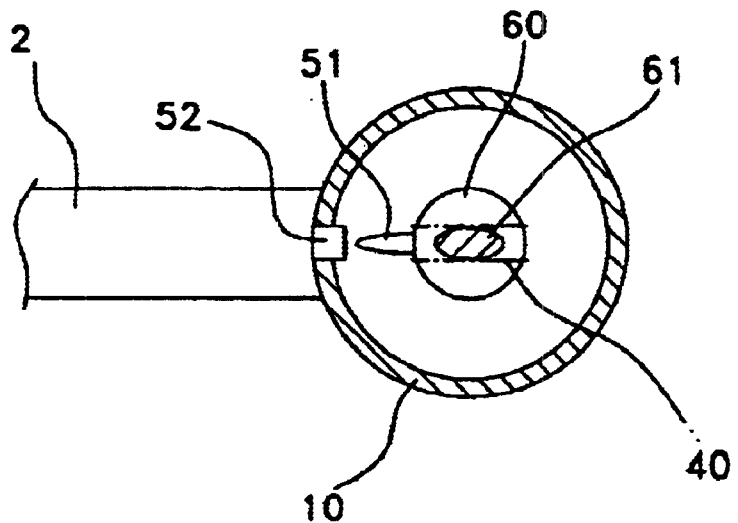
FIGS. 22 to 24 are sectional views illustrating another embodiment of the folder operating apparatus of FIG. 21.
Figure 23:
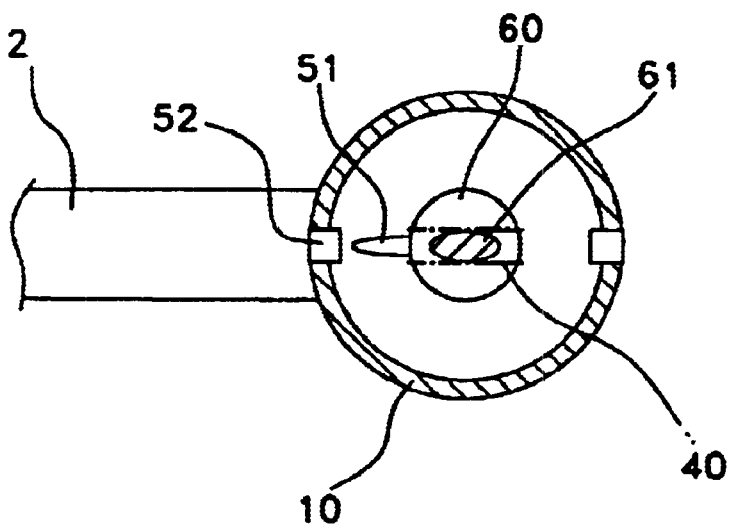

Further, As shown in FIG. 22, it is possible that on the outer periphery of the hinge shaft 60, one position detector 51 may be mounted, and on the inner periphery of the rotating section 10 opposite to outer periphery of the hinge shaft, other position detector 52 may be mounted, so that the two position detectors have the same phase each other at 360 degrees, and as shown in FIG. 21, one position detector 51 may be mounted, and a pair of the position detectors 52 may be mounted at an interval of 180 degrees thus to have the same phase at 180 degrees each other.

Figure 24:
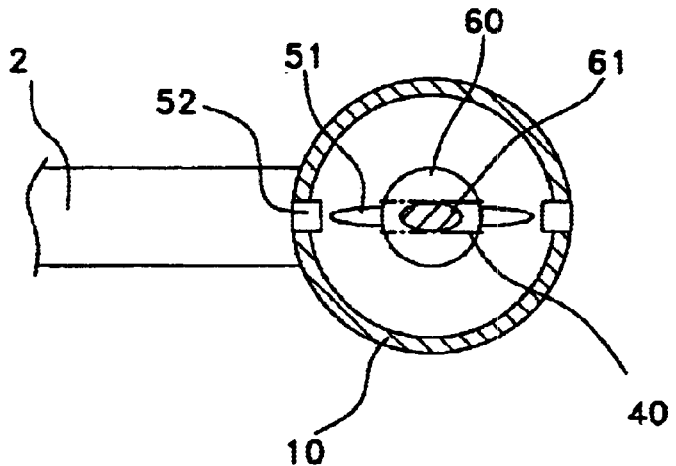

Further, as shown in FIG. 24, it may be possible to mount a pair of position detectors 51 and 52 at an interval of 180 degrees so as to obtain the same phase information.

These position detectors 51 and 52 may be an usual magnetic sensor or a photo-sensor etc. that outputs a predetermined electric signal by an interaction, and a contact switch 5 that outputs a predetermined electric signal when contacted each other.

The folder driving apparatus of the cellular phone described above will now be explained in the following.

When the user rotates the folder 2 in a forward or reverse direction to open or close the same manually, the rotation section 10 and the hinge shaft mounted thereto also are interlocked by the rotation of the folder 2 thus to be rotated in a forward or reverse direction in unity.

Here, since the reduction gear body 13 is prevented from reverse rotation, a cam 61 of the hinge shaft 60 extends the spring with a rectangular connection shaft thereof thus to be rotated.

Accordingly, the rotating force generated from the folder by the user's operational force allows the folder 2 to be opened or closed manually while the spring 40 supporting the cam 61 of the hinge shaft 60 is extended elastically.

Figure 25:
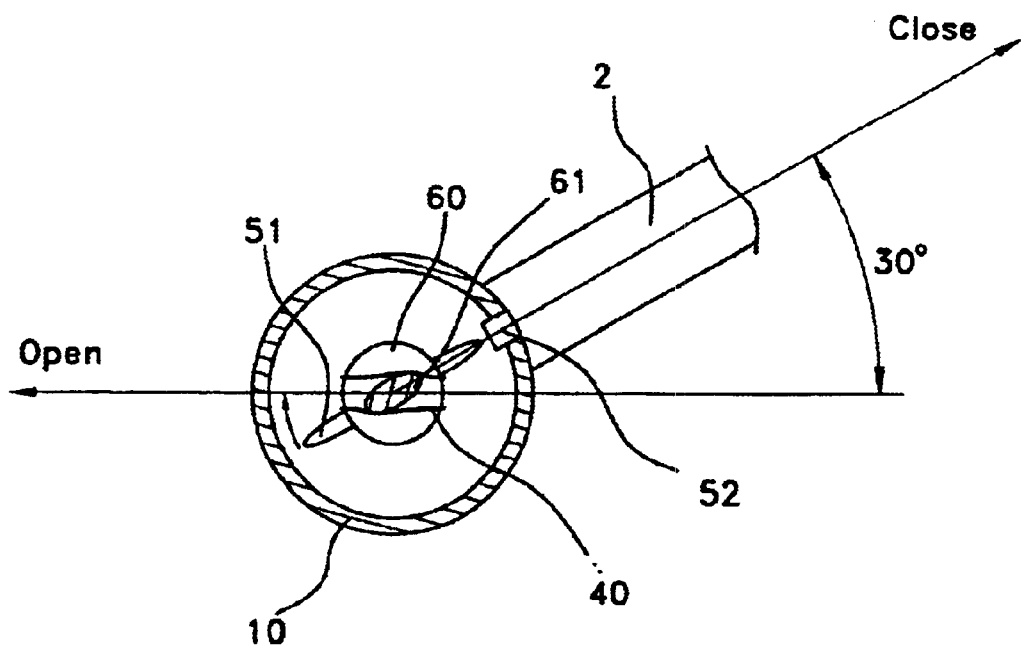
FIGS. 25 to 27 are sectional views illustrating the opening of the folder in an automatic mode in the folder operating apparatus of FIG. 20.
Figure 26:
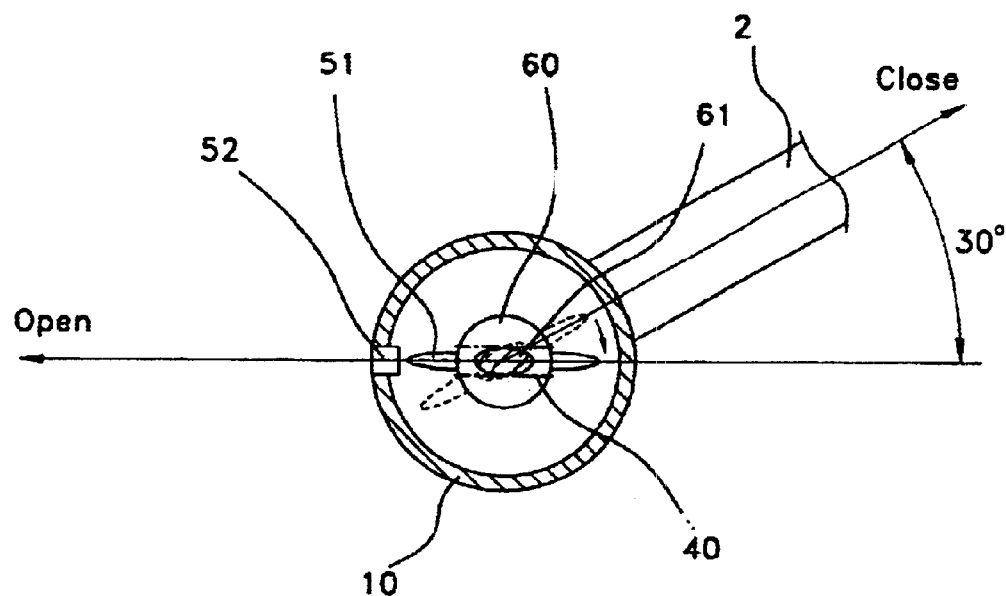
Figure 27:
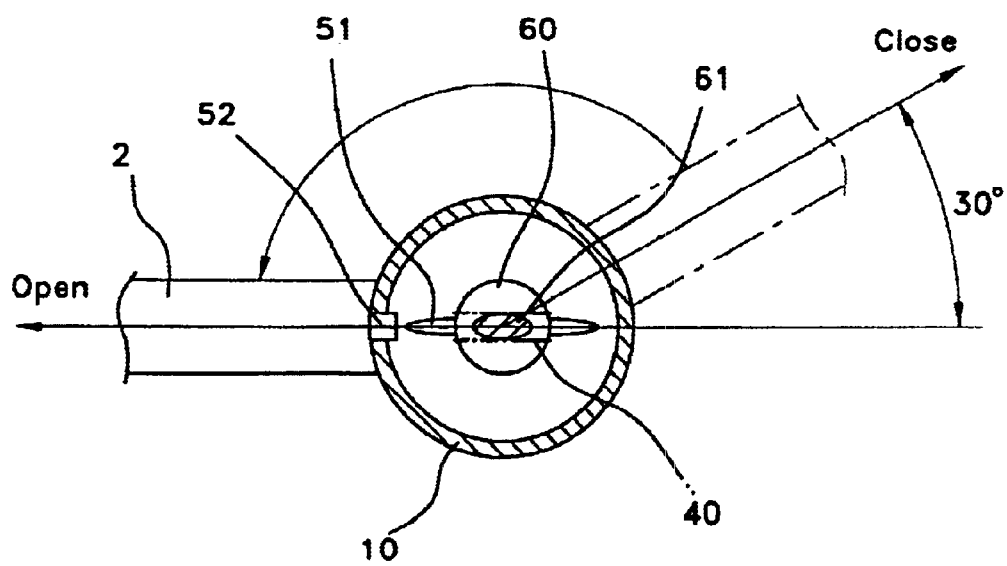

In the case of automatically opening of the folder 2, the operation thereof is shown in FIG. 25 to FIG. 27 which illustrate the C—C lines of FIG. 20.

An another embodiment of the folder driving apparatus of the cellular phone shown in FIG. 20 is now explained in the following.

When the user operates the switch 5 provided on one side of the body 3 to open the folder 2 automatically, the switch 5 applies a predetermined electric signal to the motor 12 of the driving apparatus 11.

Then, the motor generates a predetermined rotation force in a direction for opening the folder 2 by an electric power from a battery pack 4 mounted to the cellular phone 1. The generated rotation force is transmitted to the hinge shaft 60 connected to the output terminal in a state of speed reduction in a constant ratio via reduction gear assembly 13.

Here, since the cam 61 is rotated at a certain angle and extend the spring 40 to elastically shield the folder 2, when the motor 12 is driven, the cam is horizontally moved by a supporting force of the spring 40.

Thus, the cam 61 of the hinge shaft 60 is elastically supported by the spring 40 and keep in fixed state in it, so that the hinge shaft 60 may not be rotated but the outer body consisting of the driving section 11 may be rotated.

The folder 2 comprising the rotation section 10 to which the driving section 11 is mounted, is thus one-way rotated to a position where the folder is opened.

Further, when the position detector 51 mounted on the outer periphery of the hinge shaft 60 has the same phase as that of the position detector 52 mounted on the inner periphery of the rotation section 10 while the hinge shaft 60 is rotated, a predetermined electric signal is applied to the motor 12 to stop the driving thereof, so that the folder 2 is opened.

Figure 28:
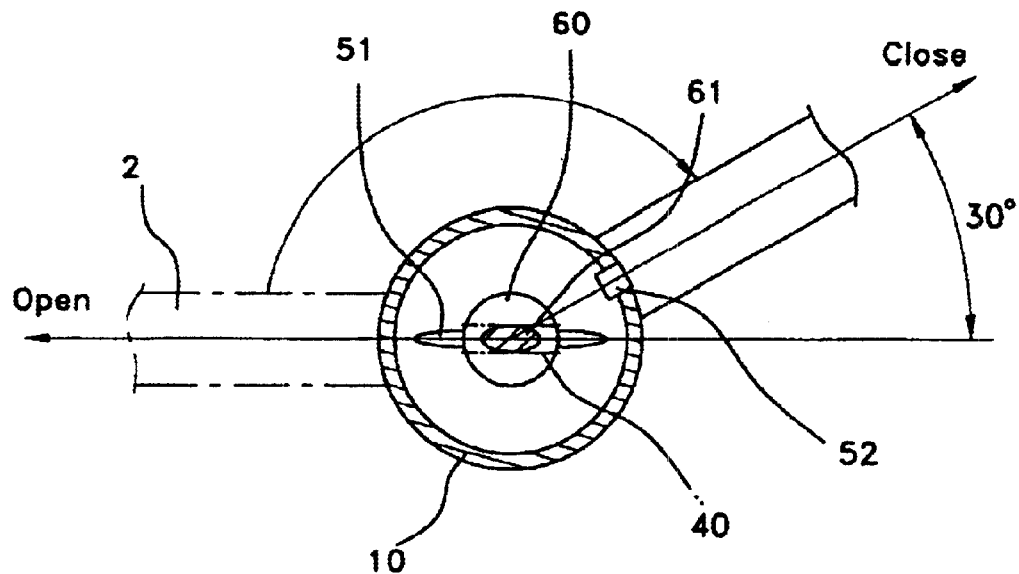
FIGS. 28 to 30 are sectional views illustrating the closing of the folder in an automatic mode in the folder operating apparatus of FIG. 20.
Figure 29:
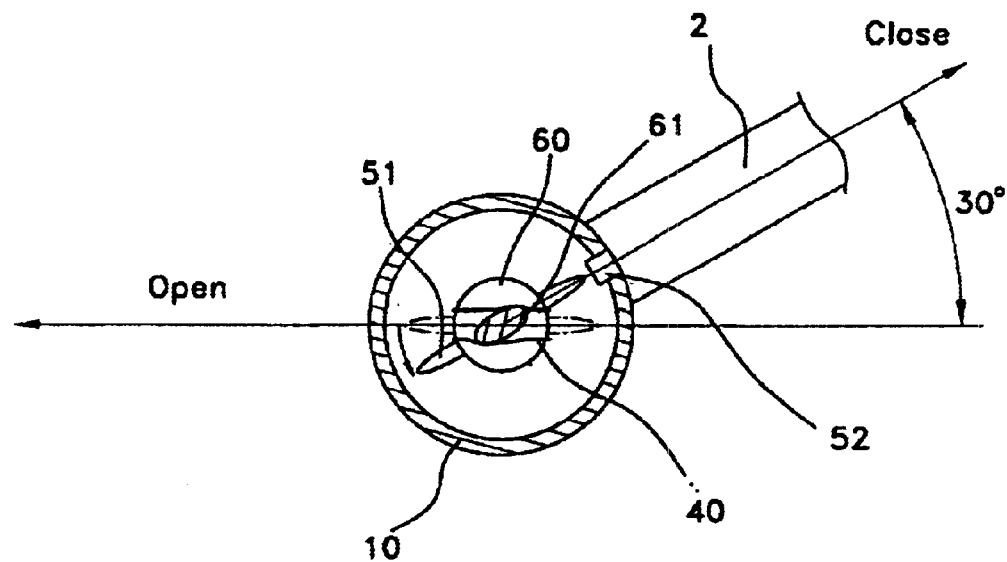
Figure 30:
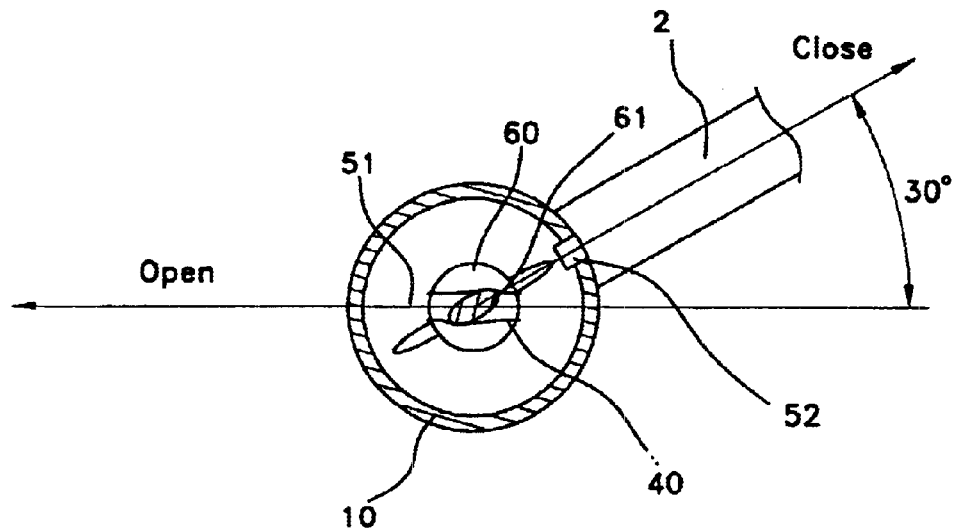

Meanwhile, in the automatic closing mode, the folder 2 is operated as shown in FIG. 28 to FIG. 30 which illustrate the second embodiment of the folder driving apparatus of the cellular phone and depict the lines C—C of FIG. 20.

FIG. 20. will now be explained in the following.

When the user operates the switch 5 provided on one side of the body 3 to open the folder 2 automatically, the switch 5 applies a predetermined electric signal to the motor 12 of the driving section 11.

Then, the motor generates a predetermined rotation force in a direction for closing the folder 2 by an electric power from a battery pack 4 mounted to the cellular phone 1. The generated rotation force is transmitted to the hinge shaft 60 connected to the output terminal in a state of speed reduction in a constant ratio via reduction gear assembly 13.

Since the cam 61 is resiliently supported by the spring 40 installed in the fixing groove 31 of the shaft fixing portion 30, the hinge shaft 60 does not rotate, while the outer body consisting driving means 11 can be rotated.

Accordingly, the driving means 11 is mounted on the rotating section 10 of the folder 2, so that the folder 2 is rotated reverse to be moved to a shield position.

If the folder 2 reaches to the shield position, the folder cannot be further rotated by contacting with the body 3. Therefore, the load acts on the driving means 11, and the cam 61 of the hinge shaft 60 overcomes the biasing force of the spring to rotate.

Then, according to the rotation of the hinge shaft 60, the phases of the positioning detectors 51 and 52 are equal to each other, so that the drive of the motor 12 is stopped for completing the shield of the folder 2.

Figure 31:
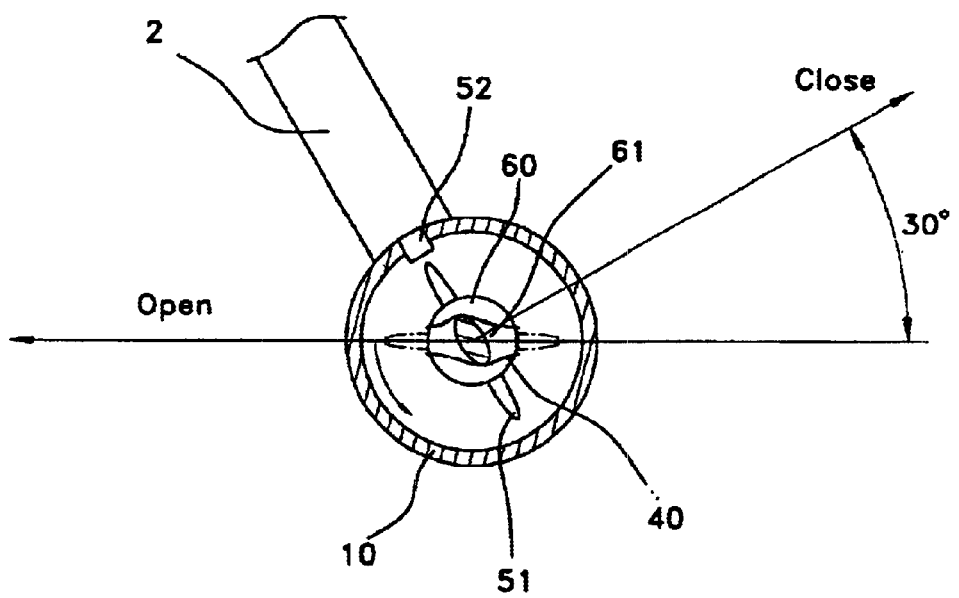
FIGS. 31 and 32 are sectional views illustrating the state that the folder is overloaded.
Figure 32:
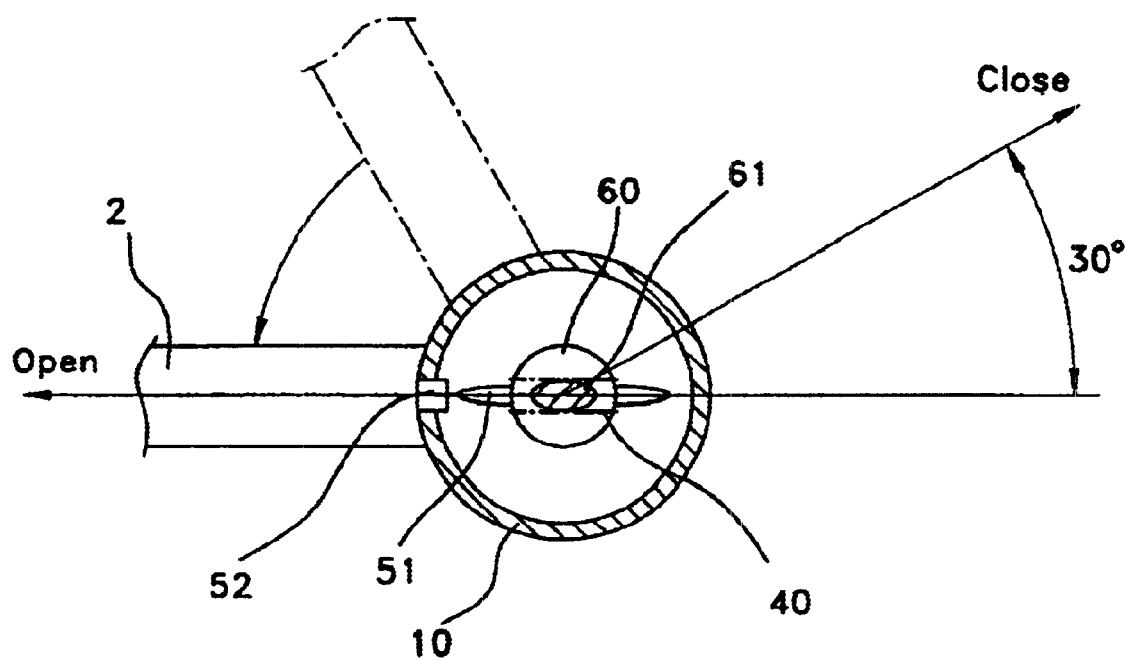

FIGS. 31 and 32 are sectional views illustrating the state that the folder is overloaded, in which FIGS. 31 and 32 are cross sectional views taken along a line B—B.

The folder driving apparatus according to a second embodiment of the present invention will now be explained.

If a load is applied to the folder operating in the auto mode, the folder 2 is stopped, and the hinge shaft 60 overcomes the biasing force of the spring to be rotated.

Accordingly, the phases of the positioning detectors 51 and 52 are equal to each other, so that the operation of the motor 12 is stopped and the hinge shaft 60 and the folder 2 are positioned in a same point as that of the manual mode.

Therefore, the folder 2 moves to a position adjacent to any one of open and close positions to complete its opening or closing.

If the external force is applied to the folder during the automatic opening and closing of the folder 2, the opening and closing of the folder 2 is achieved by the same operation as that of the above case.

As described above, according to the folder operating apparatus of the present invention, the folder can be opened and closed both automatically and manually. Also, since the phase difference of the folder produced when the folder is opened/closed automatically or manually can be compensated for, the performance of the cellular phone can be improved with its simple construction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A folder operating apparatus for a cellular phone comprising:
    a rotating section provided in a folder and having driving means for generating a driving force;
    a fixing section, connected to a body, for rotatably supporting the body at both sides of the rotating section;
    a power transferring section provided with a pair of members connected to the driving means and the fixing section, and selectively engaged together to face each other;
    elastic means for applying to the power transferring section a supporting force greater than a driving torque of the driving means, and being elastically compressed so that the members of the power transferring section are separated from each other when an external force is applied to the folder; and
    position detecting means, installed at corresponding positions of the rotating section and the power transferring section, for controlling the driving means when the rotating section and the power transferring section are in a same-phase state.

2. The apparatus according to claim 1, wherein the power transferring section comprises:
    a male coupler connected to the driving means by a shaft, and having tapered portions formed on both sides thereof so that its center portion is projected; and
    a female coupler connected to one side of the fixing section, and having tapered portions on both sides thereof so that its center portion is recessed to fit the center projected portion of the male coupler.

3. The apparatus according to claim 1, wherein the power transferring section comprises:
    a female coupler connected to the driving means by a shaft, and having tapered portions formed on both sides thereof so that its center portion is recessed; and
    a male coupler connected to one side of the fixing section, and having tapered portions formed on both sides thereof so that its center portion is projected to fit the center recessed portion of the female coupler.

4. The apparatus according to claim 1, wherein the position detecting means comprises at least one pair of position detectors installed on one side of a component integrally connected to the rotating section and on one side of another component integrally connected to the shaft, respectively, wherein the at least one pair of position detectors detect corresponding positions, and apply a stop signal to the driving means.

5. The apparatus according to claim 1, wherein the driving means comprises:
    a motor, electrically connected to a switch, for generating a forward and reverse rotating force; and
    a reduction gear assembly, connected to a shaft of the motor, for reducing a rotating speed of the motor and preventing a reverse rotation of the motor.

6. The apparatus according to claim 1, wherein the driving means stops its operation if a control signal is applied thereto from the position detecting section.

7. The apparatus according to claim 1, wherein the elastic means comprises a spring one end of which is connected to one side of the driving means and the other end of which is connected to the rotating section to apply the elastic supporting force to the power transferring section.

8. The apparatus according to claim 1, the elastic means comprises a spring one end of which is connected to one side of the fixing means and the other end of which is connected to one side of the power transferring section at a predetermined space from the fixing section to apply the elastic supporting force to the power transferring section.

9. A folder operating apparatus for a cellular phone comprising:
    a rotating section which is provided in a folder and in which a driving means for generating a driving force is installed, is the rotating section having a shape in that a projection is formed on one side thereof and the other end thereof is open;
    a fixing section, connected to a body and having fixing holes formed therethrough to face each other, for rotatably supporting the body at both sides of the rotating section;
    a hinge shaft connected to an output shaft of the driving means and having a cam formed on its end portion and positioned in the fixing hole formed on one side of the fixing section;
    elastic means, installed in the fixing hole where the cam is inserted, for applying to an elastic supporting force to the cam;
    a switch, provided on one side of the body, for applying an operation signal to the driving means; and
    position detecting means, installed at corresponding positions of the hinge shaft and the rotating section, for controlling the driving means when the hinge shaft and the rotating section are in a same-phase state.

10. The apparatus according to claim 9, wherein the driving means comprises:
    a motor for generating a forward and reverse rotating force; and a reduction gear assembly, connected to a shaft of the motor, for reducing a rotating speed of the motor and preventing a reverse rotation of the motor.

11. The apparatus according to claim 9, wherein the driving means stops its operation if a control signal is applied thereto from the position detecting section.

12. The apparatus according to claim 9, wherein the elastic means comprises a spring which applies to the cam the elastic supporting force greater than a driving torque of the driving means and is elastically deformed by an external force applied to the folder so that the cam is rotated.

13. The apparatus according to claim 9, wherein the spring comprises a pair of plate springs, installed at a predetermined interval in the fixing hole where the hinge shaft is inserted, for elastically supporting the cam at both sides thereof.

14. The apparatus according to claim 9, wherein the position detecting means comprises at least one pair of position detectors installed on one side of a component integrally connected to the hinge shaft and on one side of another component integrally connected to the rotating section, respectively, wherein the at least one pair of position detectors output electric signals when the hinge shaft and the rotating section are in a same-phase state.

15. A folder operating method for a cellular phone comprising the steps of:

manipulating an open switch in a state that a folder is closed;

operating driving means if a switch signal is inputted at the switch manipulating step;

transferring a driving force to the folder by a power transferring section connected to the driving means at the driving means operating step;

detecting same-phase information by position detecting means when the folder is completely opened at the driving force transferring step; and stopping the driving means if a detected signal is inputted from the position detecting means at the same-phase information detecting step.

16. A folder operating method for a cellular phone comprising the steps of:

manipulating an close switch in a state that a folder is opened;

operating driving means if a switch signal is inputted at the switch manipulating step;

transferring a driving force to the folder by a power transferring section connected to the driving means at the driving means operating step;

detecting same-phase information by a position detecting means when the folder is completely closed at the driving force transferring step; and stopping the driving means if a detected signal is inputted from the position detecting means at the same-phase information detecting step.

17. A folder operating apparatus for a cellular phone comprising:

a rotating section provided in a folder and having driving means for generating a driving force;

a fixing section, connected to a body, for rotatably supporting the body at both sides of the rotating section;

a power transferring section provided with a pair of members both ends of which are connected to an elastic means installed in the driving means and the fixing section, and which are selectively engaged together to face each other;

elastic means, provided in one side of the fixing section, for applying to the power transferring section a supporting force greater than a driving torque of the driving means, and being elastically compressed so that the members of the power transferring section are separated from each other when an external force is applied to the folder; and position detecting means, installed at corresponding positions of the rotating section and the power transferring section integrally connected to a shaft, for controlling the driving means when the rotating section and the power transferring section are in a same-phase state.

* * * * *